US009679264B2

(12) United States Patent
B'Far et al.

(10) Patent No.: US 9,679,264 B2
(45) Date of Patent: Jun. 13, 2017

(54) ROLE DISCOVERY USING PRIVILEGE CLUSTER ANALYSIS

(71) Applicant: Oracle International Corporation, Redwood Shores, CA (US)

(72) Inventors: Reza B'Far, Huntington Beach, CA (US); Nigel King, San Mateo, CA (US); Manoj Gudivaka, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 146 days.

(21) Appl. No.: 13/669,875

(22) Filed: Nov. 6, 2012

(65) Prior Publication Data

US 2014/0129268 A1  May 8, 2014

(51) Int. Cl.
*G06Q 10/00* (2012.01)
*G06Q 10/06* (2012.01)
*G06F 17/30* (2006.01)

(52) U.S. Cl.
CPC ........ *G06Q 10/063112* (2013.01); *G06F 17/30589* (2013.01); *G06F 2221/2145* (2013.01)

(58) Field of Classification Search
USPC ................................ 707/781, 786; 705/7.12
See application file for complete search history.

(56) References Cited

U.S. PATENT DOCUMENTS

| | | |
|---|---|---|
| 5,911,143 A | 6/1999 | Deinhart et al. |
| 6,202,066 B1 | 3/2001 | Barkley et al. |
| 7,085,834 B2 * | 8/2006 | Delany .................. G06F 21/41 |
| | | 707/999.009 |
| 7,284,000 B2 | 10/2007 | Kuehr-mclaren et al. |

(Continued)

FOREIGN PATENT DOCUMENTS

| | | |
|---|---|---|
| CN | 1437145 A | 8/2003 |
| CN | 1479232 A | 3/2004 |
| CN | 102 053 969 A | 5/2011 |

OTHER PUBLICATIONS

International Search Report and Written Opinion dated May 2, 2014, for related PCT Patent Application No. PCT/US2013/068494, 9 pages.

(Continued)

*Primary Examiner* — Beth V Boswell
*Assistant Examiner* — Joseph Waesco
(74) *Attorney, Agent, or Firm* — Vista IP Law Group, LLP

(57) ABSTRACT

Systems and methods used in human resource management systems. The method optimizes the assignment of permissions (e.g., ability to write to a database, ability to create a new account, etc.) to jobs. The method discovers relationships between jobs, duties and privileges by accessing an organization chart that relates a plurality of jobs, a plurality of specific duties to be performed within the purview of a given job, and a plurality of permissions for the respective duties of the job. The method then flattens the organization chart to enumerate the permissions inherited by the jobs. The method proceeds to mine the inherited permissions across the jobs to optimize the sets of permissions. The sets can be optimized (e.g., minimize number of sets, maximize coverage, etc.) and named so as to be conveniently assigned (e.g., by an HR person) to a job (e.g., in the case of a new employee).

20 Claims, 9 Drawing Sheets

(56) References Cited

U.S. PATENT DOCUMENTS

| | | | |
|---|---|---|---|
| 7,617,245 B2* | 11/2009 | De Souza | G06Q 10/06 705/7.23 |
| 7,650,633 B2 | 1/2010 | Whitson | |
| 7,693,861 B2* | 4/2010 | Mital | G06Q 10/0633 705/1.1 |
| 8,005,704 B2* | 8/2011 | MacFarlane | G06Q 10/10 705/7.21 |
| 8,117,643 B2 | 2/2012 | Vidya et al. | |
| 8,225,283 B2* | 7/2012 | Singh | G06F 8/71 717/101 |
| 8,554,599 B2* | 10/2013 | Ghosh | G06Q 10/06311 705/7.12 |
| 8,745,188 B2* | 6/2014 | Westerfeld | H04L 43/10 709/223 |
| 2002/0156879 A1* | 10/2002 | Delany | H04L 63/102 709/223 |
| 2004/0010519 A1* | 1/2004 | Sinn | G06F 17/30867 |
| 2004/0010606 A1* | 1/2004 | Delaney | G06F 21/31 709/229 |
| 2004/0153350 A1* | 8/2004 | Kim | G06Q 10/10 718/106 |
| 2005/0027585 A1* | 2/2005 | Wodtke | G06Q 10/10 705/7.26 |
| 2005/0071347 A1* | 3/2005 | Chau | G06F 17/218 |
| 2005/0138419 A1 | 6/2005 | Gupta et al. | |
| 2005/0138420 A1* | 6/2005 | Sampathkumar | G06Q 10/10 726/4 |
| 2005/0262112 A1* | 11/2005 | Moore | G06Q 10/06 |
| 2006/0086783 A1* | 4/2006 | Tredeau | G06Q 20/04 235/379 |
| 2006/0143193 A1* | 6/2006 | Thakkar | G06Q 10/10 |
| 2006/0218028 A1* | 9/2006 | Kelly | G06Q 10/06 705/7.11 |
| 2006/0218030 A1* | 9/2006 | Ghosh | G06Q 10/06311 705/7.15 |
| 2006/0241997 A1* | 10/2006 | Bhatawdekar | G06Q 10/06 705/7.17 |
| 2007/0192191 A1* | 8/2007 | Neal | G06Q 10/08 705/14.26 |
| 2008/0052102 A1 | 2/2008 | Taneja et al. | |
| 2008/0263060 A1* | 10/2008 | Benantar | G06Q 10/06 |
| 2010/0023522 A1 | 1/2010 | Madathilparambil et al. | |
| 2010/0070930 A1 | 3/2010 | Thibault | |
| 2010/0306008 A1* | 12/2010 | Grebenik | G06Q 10/10 705/7.13 |
| 2011/0072052 A1 | 3/2011 | Skarin et al. | |
| 2011/0162034 A1 | 6/2011 | Nagaratnam et al. | |
| 2012/0023554 A1 | 1/2012 | Murgia et al. | |
| 2012/0036209 A1 | 2/2012 | Lewis et al. | |
| 2012/0072255 A1 | 3/2012 | Harthcryde et al. | |
| 2012/0239454 A1 | 9/2012 | Taix et al. | |

OTHER PUBLICATIONS

Jurgen Schlegelmilch, et al., "Role Mining with ORCA", SACMAT'05, Jun. 1-3, 2005, Stockholm, Sweden, ACM 1-59593-045-0/05/0006, 9 pages.
Extended European Search Report dated Mar. 1, 2016 for corresponding EP Patent Application No. 13853643.8, 8 pages.
Notification of the First Office Action dated Feb. 3, 2017, for corresponding Chinese Patent Application No. 201380066826.1, 17 pages.

* cited by examiner

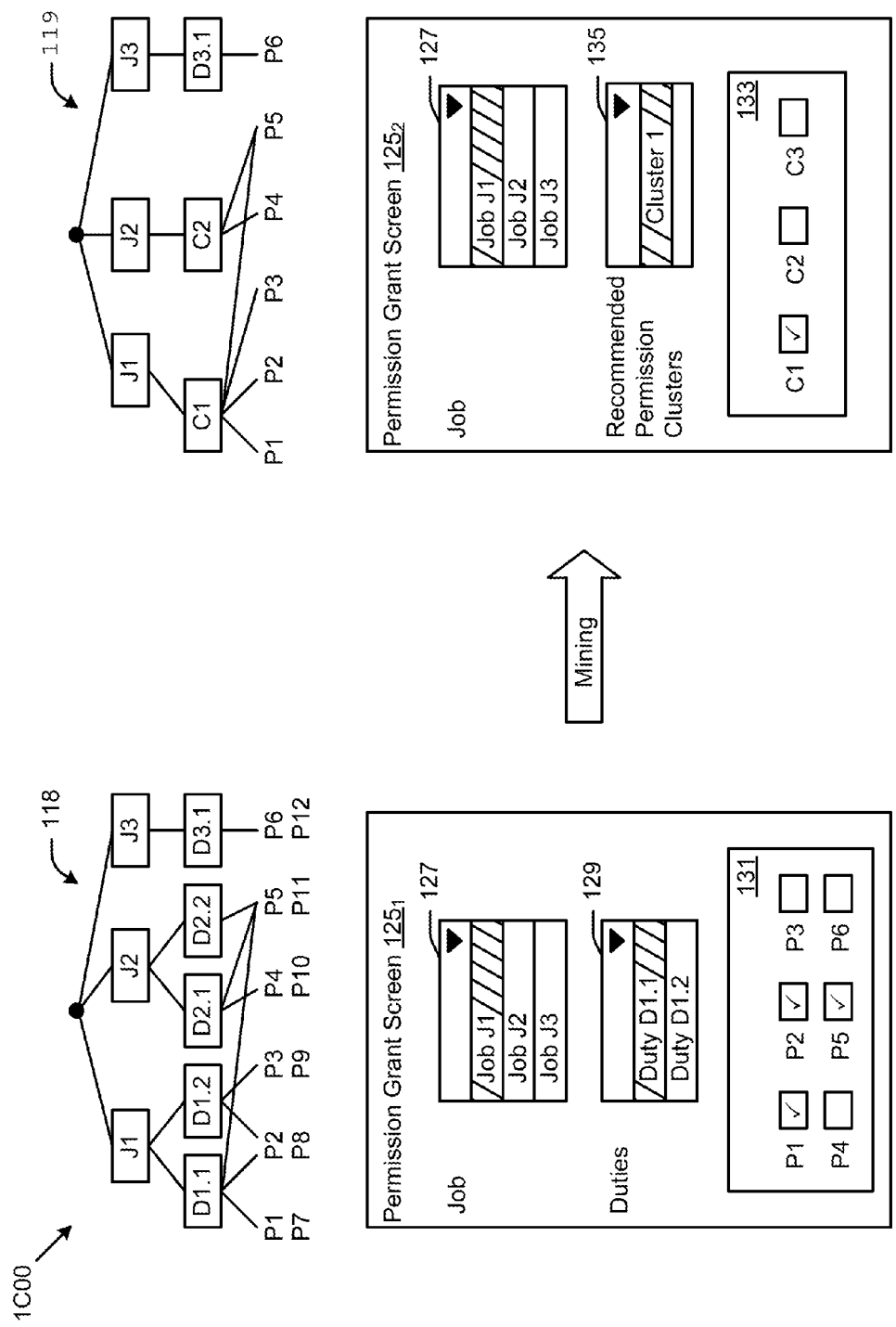

ROLE DISCOVERY USING PRIVILEGE CLUSTER ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of human resource security management and identity management systems and more particularly to techniques for role mining to discover a compact set of performance roles by analyzing permission clusters.

BACKGROUND

Some embodiments of the present disclosure are directed to an improved approach for managing permissions based on de-facto job performance roles vis-à-vis their respective permission clusters.

Many medium-to-large companies use human resource management systems as a component of their enterprise-wide uses of enterprise software applications. Historically, an employee would take on a particular title (e.g., manager, supervisor, etc.) within a particular department or other organizational structure (e.g., accounts payable, purchasing, etc.). An employee who takes on a particular title or job assumes one or more duties (e.g., enter invoices, approve a purchase order, etc.). In an enterprise setting that makes use of enterprise software applications, organizational rules and checks-and-balances are enforced by authorizing a particular employee to perform some particular activities or operations using the enterprise software.

Legacy techniques granted such authorizations (e.g., authorization to approve a payment, authorization to approve a purchase order) to an employee based solely on the employee's job or title as a proxy for individual privileges or permissions. However, the adoption of enterprise software has greatly enhanced the productivity of any single employee, and accordingly a given single employee is expected to perform within an ever increasing span of responsibility and control. Moreover, many enterprises have instituted aspects of matrix management where a given single employee is expected to take on responsibilities that cross traditional organizational boundaries. Further, most medium-to-large companies institute training for new employees, and many also implement organizational resilience by assigning a secondary or backup person to fill-in in the event that the primary person is unable to perform, and the secondary personnel must be able to (at least temporarily) take on the responsibilities of the primary, and accordingly the secondary personnel must be granted applicable authorizations.

Moreover, the number of unique authorizations and the number of unique permissions needed to perform operations using enterprise software is exploding. Legacy techniques for assigning permissions to an employee have become unwieldy.

The effect of the abovementioned trends in organizational structures together with the rapid adoption of enterprise software applications exacerbates the limitation of legacy techniques. New approached are needed.

Moreover, the aforementioned technologies do not employ any techniques for role discovery or privilege cluster number minimization, or privilege cluster coverage maximization, or ranking of privilege clusters. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for role discovery using privilege cluster analysis.

Disclosed herein are systems and methods used in human resource management systems. The method optimizes the assignment of permissions (e.g., ability to write to a database, ability to create a new account, etc.) to jobs. The method discovers relationships between jobs, duties and privileges by accessing a hierarchical organization chart that relates a plurality of jobs, a plurality of specific duties to be performed within the purview of a given job, and a plurality of permissions for the respective duties of the job. The method then flattens the hierarchical organization chart to enumerate the permissions inherited by the jobs. The method proceeds to mine the inherited permissions across the jobs to optimize the sets of permissions. The sets can be optimized (e.g., minimize number of sets, maximize coverage, etc.) and named so as to be conveniently assigned (e.g., by an HR person) to a job (e.g., in the case of a new employee).

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1C depicts a system for granting permissions after mining permission clusters, according to some embodiments.

DETAILED DESCRIPTION

Figure 1A:
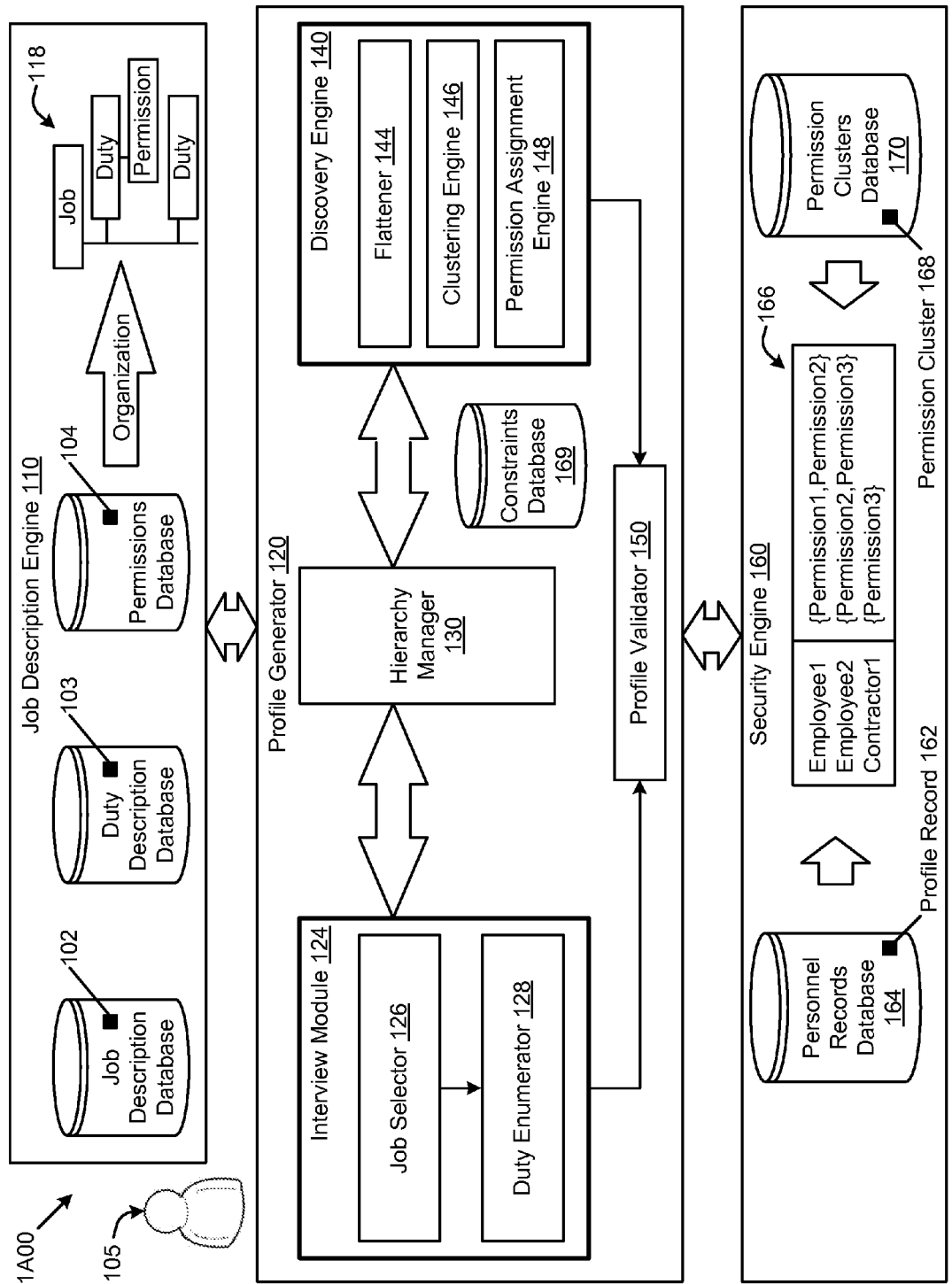
FIG. 1A depicts a system for updating a personnel profile after discovering optimal roles that grant permissions and authorizations to jobs, according to some embodiments.

Some embodiments of the present disclosure are directed to improved approaches for implementing roles discovery using privilege cluster analysis. More particularly, disclosed herein are exemplary environments, methods, and systems.

Overview

As aforementioned hereinabove, the effect of certain trends in organizational structures together with the rapid adoption of enterprise software applications highlights the need for improved approaches to assign permissions to an employee.

In companies that suffer from the consequences of legacy approaches and/or do not implement a disciplined role-based approach to checks-and-balances (and a disciplined approach to access control), it happens that individuals (e.g., employee or contractor, etc.) may be granted permissions that are unrelated to their current job function. And, in some cases, an individual may be granted permissions that wield more power than is appropriate for the particular individual. Given the sheer number of unique permissions needed to perform operations using enterprise software, making accurate assignments of permissions to an employee can be a daunting task for a person to perform without the aid of automation. Such automation is discussed in the disclosure herein, and a panoply of embodiments are detailed by figures and descriptions, below.

Strictly as an introductory example using legacy techniques, an enterprise might implement a role-based access control model (e.g., using ACLs to allow/deny permissions to READ/WRITE data stores). However, mere access control to data stores using legacy techniques fails to account for the granularity needed for effective checks-and-balances within an organization. In other legacy cases prevalent in larger enterprises, a list of permissions (e.g., create a supplier record, modify a supplier contact record, etc.) applicable to a particular job (e.g., manager, supervisor, etc.) role might comprise more than 100 permissions for just that single particular job.

One approach to address the deficiencies of legacy approaches is to perform cluster analysis over a universe of permissions defined by the actual permissions granted to a set of jobs. The cluster analysis serves to discover optimal roles that grant permissions and authorizations to jobs. The clustering techniques as disclosed herein provide a means to identify groups of permissions that are granted to a large number of jobs (or other principles). Further, quantitative techniques can be applied to optimize the set of groups of permissions such that they are granted to a maximally large number of jobs.

Still further improvements emerge when an objective function is used to optimize (e.g., minimize) the set of groups of permissions that nonetheless cover the full range of jobs, and thus minimize the burden of security administration. A slightly more formal description of the optimization problem is to simultaneously minimize the number of (discovered) roles, minimize the number of grants of permissions or authorizations, and minimize the number of role memberships. Approaches to solving this simultaneous minimization problem are disclosed in detail herein.

DEFINITIONS

Some of the terms used in this description are defined below for easy reference. The presented terms and their respective definitions are not rigidly restricted to these definitions—a term may be further defined by the term's use in within this disclosure.

The term "job" or "title" refers to a name ascribed to a person (e.g., and employee or a contractor, etc.) who is tasked to perform applicable duties. For example, a person might accept the position or job of a manager, or of a supervisor.

The term "duty" or "role" refers to a name ascribed to an activity or responsibility to be performed by a person who holds a particular job or title.

The term "permission" or "privilege" or "authorization" refers to a granted ability perform a particular activity, which in turn may correspond to a particular duty. For example, a duty to approve a purchase order can be codified to a permission to read a purchase order from a database, and to view a corresponding authorization signature block, and to sign the purchase order, and to store the authorizing signature block in the database.

The term "virtual role" refers to a discovered set of privileges. A "role" as defined above refers to a named role ascribed to an activity or responsibility to be performed by a person who holds a particular job or title. A virtual role is discovered through cluster analysis; a virtual role may or may not correspond to any existing named role.

The term "logic" means any combination of software or hardware that is used to implement all or part of the embodiments of the present disclosure.

A "module" includes any mix of any portions of computer memory and any extent of circuitry including hardwired logic or circuitry embodied as a processor.

Reference is now made in detail to certain embodiments. The disclosed embodiments are not intended to be limiting of the claims.

DESCRIPTIONS OF EXEMPLARY EMBODIMENTS

FIG. 1A depicts a system 1A00 for updating a personnel profile after discovering optimal roles that grant permissions and authorizations to jobs. As an option, the present system 1A00 may be implemented in the context of the architecture and functionality of the embodiments described herein. Also, the system 1A00 or any aspect therein may be implemented in any desired environment.

The shown system analyzes clusters of permissions and/or authorizations and discovers the most efficient clusters of permissions and/or authorizations that are then deemed to be candidates to become virtual roles. More specifically, such discovered clusters of permissions are prioritized to be considered candidates. Prioritization can be based on several quantitative factors. For example:

On the basis of a relatively smaller number of roles, grants and role hierarchy memberships needed to be administered; and/or, The discovered clusters of permissions grant exactly the same set of authorizations granted to the jobs as existed prior to the process of discovering clusters of permissions.

As further examples, in some embodiments, a cluster of permissions is prioritized for consideration as a candidate role based on a function (e.g. arithmetic product) of two or more quantities such as:

The number of privileges it contains;

The number of jobs that are authorized to all of the privileges in the cluster.

Still further, a cluster of permissions can be selected-in or rejected for consideration as a candidate role based on one or more constraints, which constraints can be codified and stored in a constraints database 169 and made accessible to modules within system 1A00. Strictly as examples, constraints can be codified as:

Do not authorize to any job, (or person), any privilege that was not authorized in the preexisting role hierarchy.

No candidate role should be created that would contain a combination of privileges that constitute a segregation of duties violation. For example, this constraint would prevent the pair of privileges "create a supplier" and "authorize payment to supplier" from being granted to the same entity.

In an enterprise setting, a constraints database 169 might comprise an extensive set of such segregation of duties constraints so as to describe and enforce intra-enterprise and extra-enterprise checks and balances.

An assignment following the techniques of this section (and as disclosed elsewhere in this disclosure) satisfies the objectives of:

minimizing the number of roles;

minimizing the number of role memberships; and/or, ensuring that jobs are not authorized to functionality not required for the job.

As shown, the system 1A00 comprises a job description engine 110, a profile generator 120, and a security engine 160, which modules are in communication one with another. The job description engine comprises a job descriptions database for storing and retrieving one or more job descriptions 102, a duty descriptions database for storing and retrieving one or more duty descriptions 103, and a permissions descriptions database for storing and retrieving one or more permission descriptions 104. The job descriptions 102 (or any aspect of a job description) together with duty descriptions 103 (or any aspect of a duty description), and together with permission descriptions 104 (or any aspect of a permission description) can be formed into an organization chart (e.g., a hierarchical graph 118). Such an organization chart or graph is computer-readable and can be traversed by a computer processor to perform analysis (e.g., analysis as discussed herein). Application of the results of the analysis can serve to satisfy the abovementioned objectives.

The profile generator 120 serves to accept inputs from the job description engine, to perform analysis, and to output a profile record, possibly for storage in a personnel database, and for later retrieval during the performance of a job or role. A profile record might be stored in a personnel records database 164, and a profile record can comprise any forms of human resource or personnel-centric data. For example, a profile record (e.g., for an employee or for a contractor or for an agent) can comprise the title and/or assigned job of the employee or contractor or agent. A profile record can further comprise personnel data such as contact and demographic information. In some embodiments a profile record may contain or refer to (e.g., directly or indirectly) corresponding duties, roles and/or virtual roles.

In exemplary operation, a user 105 operates a module of a human resource management system, specifically an interview module 124. During operation, the user might modify profile records for existing personnel, and might use an interview module 124 so as to generate a new profile record for a new employee. One possible operation in generating a new profile record for a new employee might be to establish the title and/or job of the new employee (e.g., using job selector 126), and then to enumerate the corresponding duties. The enumeration of corresponding duties can be facilitated by a duty enumerator 128, which in turn might determine the duties corresponding to a particular job by analyzing any of the job descriptions 102, the duty descriptions 103, and/or the permission descriptions 104, or by reading the hierarchical graph 118. To facilitate storage and/or retrieval of job descriptions 102, duty descriptions 103, and/or permission descriptions 104 in a form (e.g., hierarchical graph 118) that is convenient for the system, a hierarchy manager 130 serves to read any data items from the job description engine 110, and to handle input/output between the interview module 124 and between the discovery engine 140, as shown.

As earlier indicated, the sheer number of permissions to be managed in an enterprise, and the relationships between a duty and permissions, demands a computer-aided approach. Accordingly, the discovery engine 140 serves to perform analysis on the permissions and duties so as to ease the burden placed on a user. For example, one approach performs cluster analysis so as to provide a compact set of virtual roles such that every actually in-use mapping of a job to a set of permissions can be presented to the user when the user is interacting with the interview module.

Again referring to operation of the discovery engine 140, as shown, a hierarchy manager 130 can provide a hierarchy (e.g., hierarchical graph 118) to a flattener 144, the results of which can be used by a clustering engine 146 to cluster sets of permissions, and by a permission assignment engine 148 to map the clustered sets of permissions to a duty or to a virtual role. The clustered sets of permissions can be stored in any storage location (e.g., in a permission clusters database 170). Further, having the clustered sets of permissions facilitates the operation of the profile validator 150 to authorize one or more specific sets of permissions (e.g., permission cluster 168) to be recorded in the profile record 162 of the employee.

Once a profile record has been validated, it can be stored in a personnel records database 164, and any known-in-the-art techniques can be used to form a validation table 166, which can be used in the context of an enterprise software application environment, possibly using a security engine 160. For example, the identity of a particular employee can be used to retrieve a profile record 162, which profile record comprises a set of permissions granted to the particular employee. The profile record and/or any form of a derived validation table can be used in real-time. Again strictly as an example, during the course of performing an operation pertaining to a particular duty, the authorizations of permissions to a particular employee can be retrieved and matched against the permissions needed to perform that particular duty, and if the needed permissions are not granted, then denying the performance of the operation (or, conversely, allowing performance of the operation if the needed permissions are granted to the particular employee).

Returning to the discussion of the permission clusters database 170 and its use in conjunction with a security engine 160, in systems that offer a role-based access control model, a plurality of roles can be arranged in a role hierarchy. For example, a role hierarchy can be constructed of roles (named roles and/or virtual roles), where the leaves of the role hierarchy are permissions. This hierarchical description can offer convenience and ease of understanding in that at upper levels of the role hierarchy the role is likely to correspond to a job (though such a likelihood is only a likelihood and not a requirement). At lower levels of the role hierarchy the roles are likely to correspond to a line on a job description (e.g., a duty).

Figure 1B:
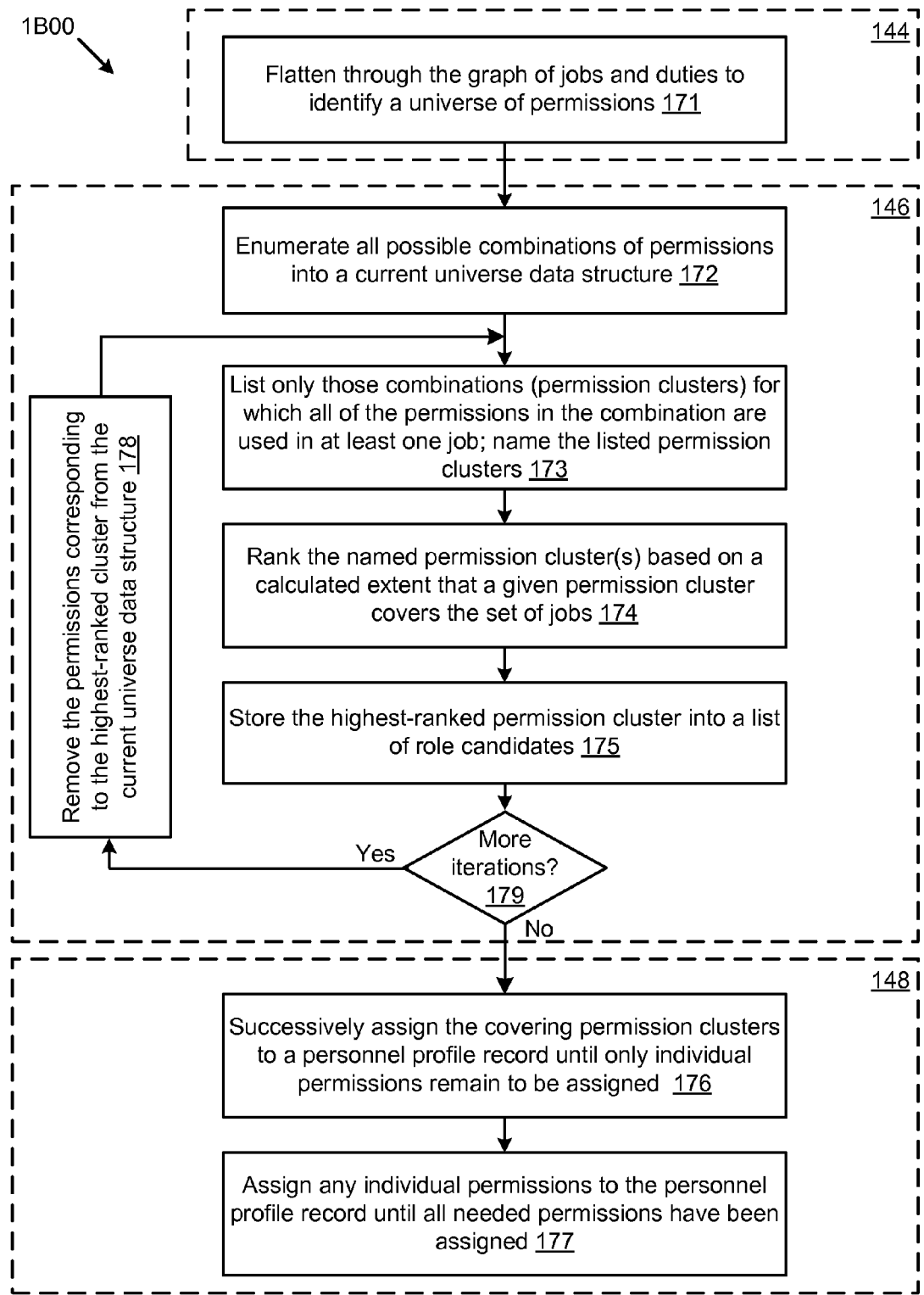
FIG. 1B depicts a system for assigning a set of permissions after discovering optimal roles that grant permissions and authorizations to jobs by analyzing permission clusters, according to some embodiments.

FIG. 1B depicts a system 1B00 for assigning a set of permissions after discovering optimal roles that grant permissions and authorizations to jobs by analyzing permission clusters. As an option, the present system 1B00 may be implemented in the context of the architecture and functionality of the embodiments described herein. Also, the system 1B00 or any aspect therein may be implemented in any desired environment.

As shown, the system 1B00 is organized into a series of steps to implement some of the operations introduced in the discussion of system 1A00. Strictly as an example, a system 1B00 can be partitioned such that some steps implement functions of the flattener 144, and/or can be partitioned such that some steps implement functions of the clustering engine 146, and/or can be partitioned such that some steps implement functions of the permission assignment engine 148. In the embodiment shown, the steps commence by reading a hierarchy (e.g., hierarchical graph 118), then flattening the hierarchy to identify a universe of permissions where a universe has at least one occurrence for each and every permission mapped to any duty or job (see operation 171). Then, having the universe of permissions, operation 172 can exhaustively enumerate all possible combinations of permissions using any known technique. This operation 172 serves to construct a data structure comprising a current universe of permissions. This current universe of permissions gets smaller as clusters are identified, ranked and assigned (see operation 178).

From the exhaustive list of all possible combinations of permissions, a list of combinations that are not used (in combination) for performance of a job can be pruned. That is, operation 173 serves to list only permission clusters (e.g., combinations of permissions) where all of the permissions in the combination are used for at least one particular job. The resulting permission clusters can be named here in operation 173 and can be re-named or labeled in another operation.

As earlier indicated, the techniques herein disclose methods to form a compact set of duties that serve to automate the authorization of a set of a priori known permissions to a set of a priori known jobs. One technique involves assigning a largest covering set of permissions (e.g., a largest covering set of permissions found in a permission cluster), then successively assigning the next largest covering set of permissions found in a next permission cluster, and iteratively performing such assignments until all of the permissions needed for a particular job (e.g., the job of the new employee) have been assigned (see the iterator test 179).

To facilitate embodiments that implement the aforementioned technique, the named permission clusters (again, see operation 173) can be ranked. Specific embodiments rank a given permission cluster based at least in part on a calculated extent that a given permission cluster covers the full set of jobs (see operation 174). Having done so, the earlier-described task of iteratively assigning a largest- or highest-ranked covering set of permissions, then successively assigning the next largest covering set of permissions, and so on. In such a process, the highest-ranked permission cluster is stored into a list of role candidates (see operation 175), after which it is determined if there are further iterations to perform, and if so, then removing the permissions corresponding to the just stored permission cluster from the current universe data structure (see operation 178).

Using a permission assignment engine 148, computer-aided assignment of a large sets of permissions can be performed with alacrity (e.g., with few successions). In some cases a name is manually assigned to a permission cluster. Then, using the (named or unnamed) ranked permission clusters, successive assignments can be performed in operation 176, or in another other operation of the permission assignment engine 148, or in any other module or operation. In some cases, even after successive applications of operation 176, it is possible that some needed permissions still remain unassigned. Thus, one or more individual permissions can be individually assigned (see operation 177).

FIG. 1C depicts a system for granting permissions after mining permission clusters. As an option, the present hierarchical chart 1C00 may be implemented in the context of the architecture and functionality of the embodiments described herein. Also, the hierarchical chart 1 C00 or any aspect therein may be implemented in any desired environment.

As shown, the system comprises a hierarchical graph 118 that describes relationships between a job and one or more duties, and between a duty and one or more permissions. The interview GUI (e.g., a permission grant screen $125_1$) comprises a jobs pull-down 127, a duties pull-down 129, and an array of permissions checkboxes 131. Also shown is an alternate instance of an interview GUI (e.g., a permission grant screen $125_2$). The permission grant screen $125_1$ and the alternate instance of permission grant screen $125_2$ vary in at least the aspect that the alternate instance of permission grant screen $125_2$ depicts many fewer checkboxes. Yet, even with fewer checkboxes, the needed permissions can be granted. In this case, the relationships to permissions have been mined, resulting in the determination of permission cluster C1, which in turn results in the presence of checkbox C1. Checking the single checkbox C1 in the alternate instance of permission grant screen $125_2$ serves the same purpose as checking the three checkboxes in permission grant screen $125_1$. In some cases, the operation of clicking a checkbox from among an array of permission clusters checkboxes 133 can be served by a recommended permission clusters pull-down 135.

Figure 2A:
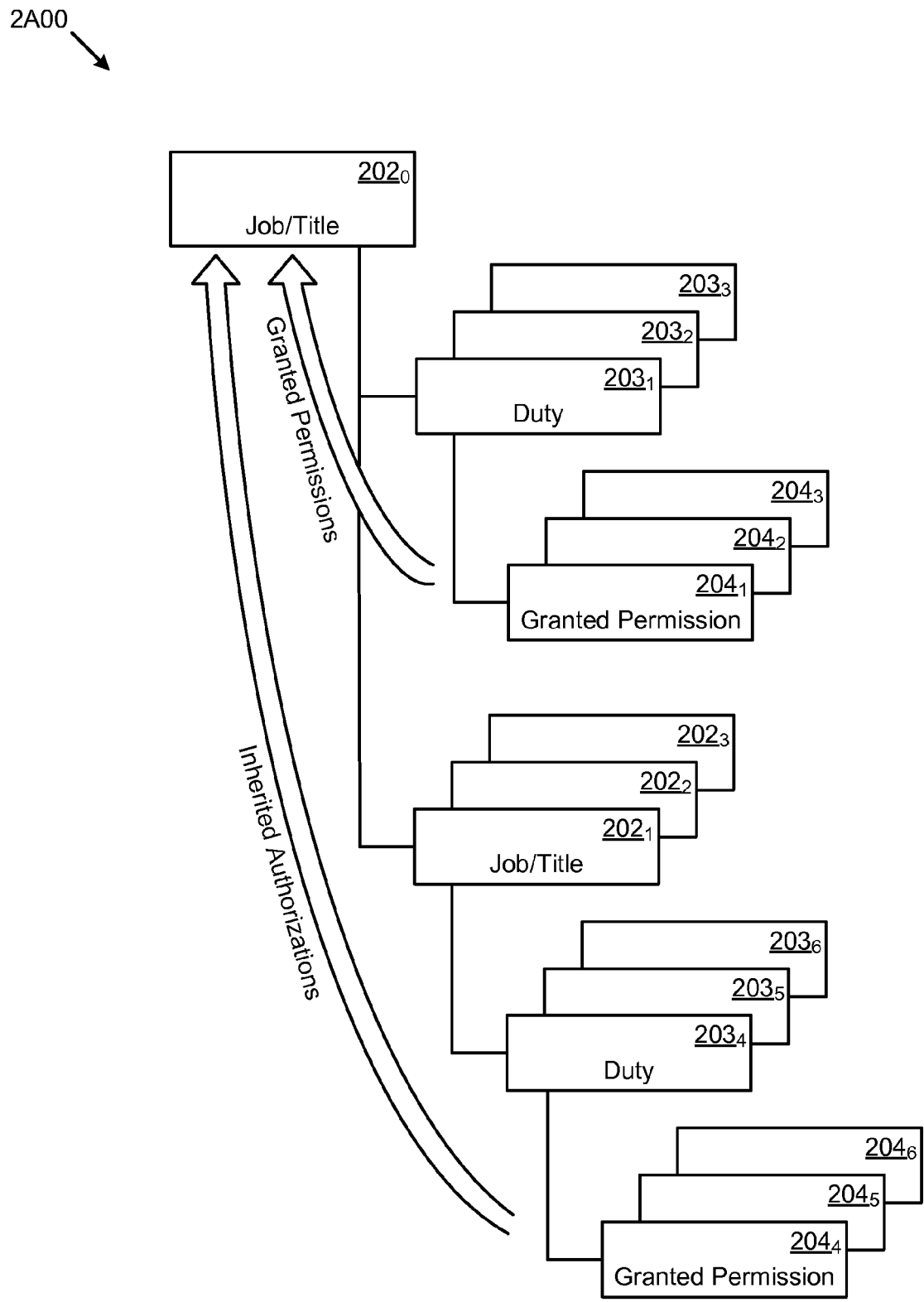
FIG. 2A is a hierarchical chart for assigning a set of permissions as used in systems for roles discovery using privilege cluster analysis, according to some embodiments.

FIG. 2A is a hierarchical chart 2A00 for assigning a set of permissions as used in systems for roles discovery using privilege cluster analysis. As an option, the present hierarchical chart 2A00 may be implemented in the context of the architecture and functionality of the embodiments described herein. Also, the hierarchical chart 2A00 or any aspect therein may be implemented in any desired environment.

A hierarchical chart such as hierarchical chart 2A00 or such as hierarchical graph 118 that describes relationships between a job and one or more duties (e.g., duty $203_1$, duty $204_2$, duty $204_3$, duty $203_4$, duty $204_5$, duty $204_6$, etc.), and describes relationships between a duty and permissions. Other relationships are possible and reasonable, and such relationships are considered in various operations of the discovery engine 140. Strictly as an example, a first job/title (e.g., job $202_0$) can have a relationship to a subordinate job and granted permissions (e.g., granted permission $204_1$, granted permission $204_2$, granted permission $204_3$). The foregoing models the situation where a higher-level employee (e.g., a boss) inherits the granted permissions (e.g., granted permission $204_4$, granted permission $204_5$, granted permission $204_6$) of a subordinate (e.g., job/title $202_1$, job/title $202_2$, job/title $202_3$).

As shown, the boss is given granted authorizations and is also given inherited granted authorizations due to the subordinate having granted permissions.

Figure 2B:
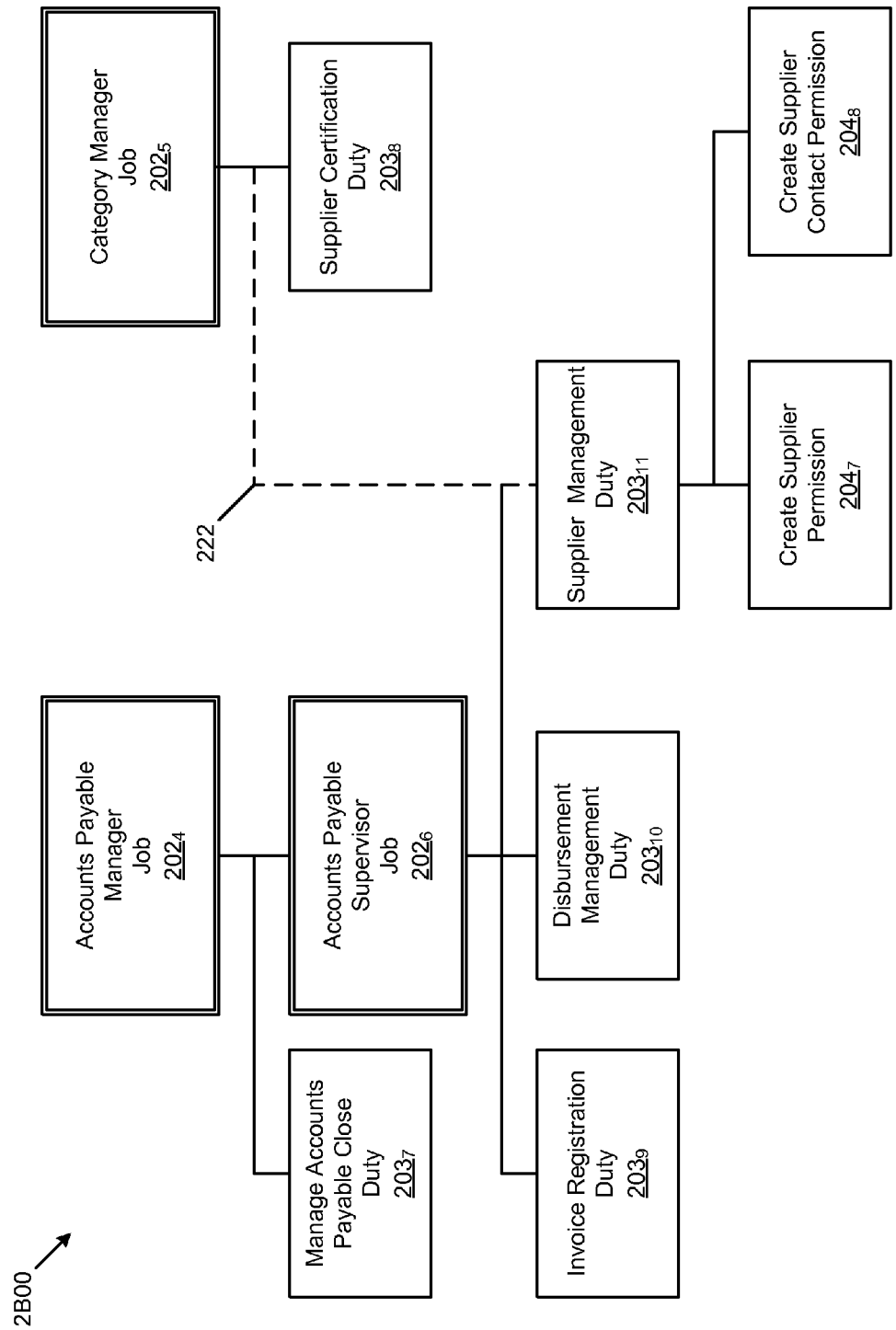
FIG. 2B is a specific example of a hierarchical chart for assigning a set of permissions as used in systems for roles discovery using privilege cluster analysis, according to some embodiments.

FIG. 2B is a specific example of a hierarchical chart 2B00 for assigning a set of permissions as used in systems for roles discovery using privilege cluster analysis. As an option, the present hierarchical chart 2B00 may be implemented in the context of the architecture and functionality of the embodiments described herein. Also, the hierarchical chart 2B00 or any aspect therein may be implemented in any desired environment.

In this specific example, the hierarchical chart 2B00 shows an accounts payable manager job $202_4$, and a category manager job $202_5$. As depicted, the person who fills the accounts payable manager job $202_4$ is the boss of the person who fills the accounts payable supervisor job $202_6$. The accounts payable supervisor job $202_6$ takes on the invoice registration duty $203_9$, the disbursement management duty $203_{10}$, and the supplier management duty $203_{11}$. Continuing, the supplier management duty $203_{11}$ needs certain permissions, specifically the create supplier permission $204_7$ and the create supplier contact permission $204_8$. As discussed in relation to hierarchical chart 2A00, the permissions of subordinates are inherited by the boss. In this case, the accounts payable manager job $202_4$ takes on the manage accounts payable close duty $203_7$, as well as all of the permission granted to subordinates. The foregoing is merely an example, and other reporting structures and relationships are possible, including matrix reporting. For example, the person who fills the category manager job $202_5$ takes on the supplier management duty $203_{11}$ as well as the supplier certification duty $203_8$. The permissions of the supplier management duty $203_{11}$ (see matrix reporting relationship 222), namely the create supplier permission $204_7$, and the create supplier contact permission $204_8$) are taken on by the category manager job $202_5$.

In absence of the herein disclosed techniques for roles discovery using privilege cluster analysis, six grants are needed to grant the two privileges to three jobs. However, observing hierarchical inheritance, creating a group of privileges (namely for the supplier management duty $203_{11}$) means that the three jobs are authorized to the two permissions through just two grants. The foregoing is a small, illustrative sample case, however when the hierarchy is deeper, and/or when there are more jobs, more duties, and more permissions, the complexity increases rapidly.

Figure 3:
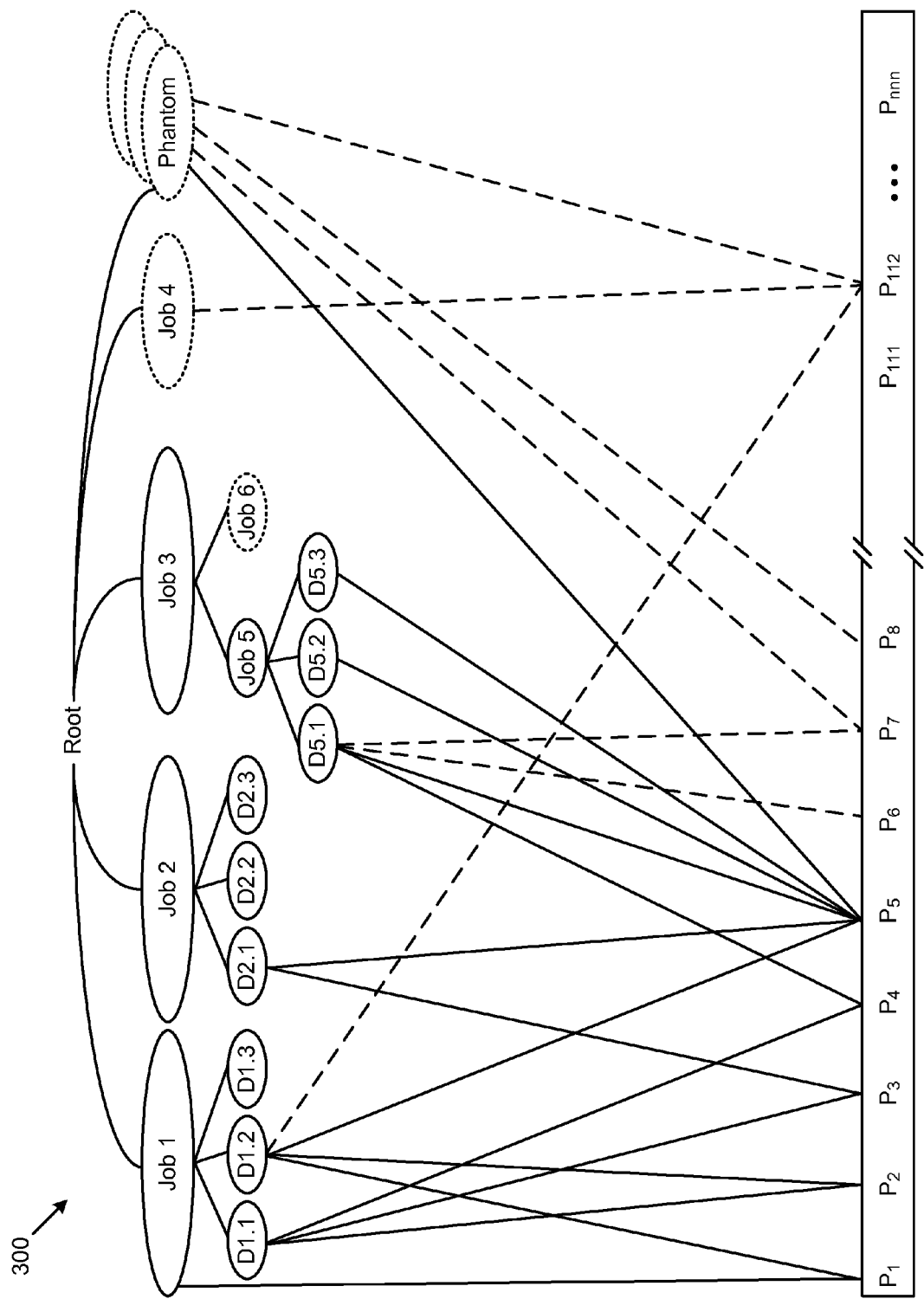
FIG. 3 exemplifies a roles hierarchy of duties to permissions as used in systems for roles discovery using privilege cluster analysis, according to some embodiments.

FIG. 3 exemplifies a roles hierarchy 300 of duties to permissions as used in systems for roles discovery using privilege cluster analysis. As an option, the present roles hierarchy 300 may be implemented in the context of the architecture and functionality of the embodiments described herein. Also, the roles hierarchy 300 or any aspect therein may be implemented in any desired environment.

As shown, six jobs {J1, J2, J3, J4, J5, J6} and a "phantom job" cover a range of permissions {P1, P2, P3, . . . P111, P112, . . . Pnnn} Job J1 has duties {D1.1, D1.2, D1.3}, job J2 has duties {D2.1, D2.2, and D2.3}, and job J3 has subordinates to fulfill jobs {J5, and J6}. Job J5 has duties {D5.1, D5.2, and D5.3}. Some given instances of a roles hierarchy can comprise nodes and/or relationships that are candidates to be pruned. For example, job J6 has no duties assigned. The phantom job depicts the situation where an exception to the list of permissions applicable to a particular job was made. In some embodiments, a given roles hierarchy might be pruned to remove such phantom jobs or other exceptions. In some cases, such pruning occurs before the flattening operations (see "Flatten the Hierarchy", below).

Phantom jobs, exceptions, unused jobs, and unused relationships are depicted using dotted lines. Any unused jobs, duties, permissions or relationships can be marked as unused in the roles hierarchy 300.

The roles hierarchy 300 presents a variety of use cases, which use cases are hereunder discussed. More particularly, various techniques for discovering a compact set of performance roles from a roles hierarchy apply to the shown roles hierarchy 300. The compact set of performance roles can be determined by forming permission clusters, then analyzing permission clusters. In exemplary cases, analyzing permission clusters results in ranking, ordering, sorting or otherwise distinguishing certain (e.g., larger, greater coverage, etc.) clusters from certain other (e.g., smaller, lesser coverage, etc.) clusters.

In one exemplary embodiment, the steps can proceed as follows:
  Flatten the Hierarchy
  Calculate Permission Clusters
  Calculate Job-Permission Clusters
  Select Candidate Privilege Clusters
  Recalculate Calculate Job-Permission Clusters
  Match Candidate Privilege Clusters Against Existing Duties
Flatten the Hierarchy The roles hierarchy 300 presents several levels of hierarchy, and the leaf nodes are all permission nodes {P1, P2, P3, . . . P111, P112, . . . Pnnn} Using any known-in-the art techniques the roles hierarchy 300 can be flattened (e.g., traversed depth first to enumerate each leaf node, or traversed breadth first to enumerate each leaf node). Such a flattening operation results in a universe of permissions. In the example given by roles hierarchy 300 the universe of permissions is {P1, P2, P3, P4, P5, P6, P7, P8 . . . P111, P112, . . . Pnnn} In some embodiments, the flattening operation can perform differently based on input parameters. For example, a parameterized flattening operation might enumerate the universe of permissions considering only permissions that have been used within some particular parameterized time period (e.g., within 365 days). In the roles hierarchy 300 shown, the dotted lines to permissions represent those that have not been used within a certain time period, and those permissions {P6, P7, P8 . . . P111, P112, . . . , Pnnn} are excluded from the universe of permissions used in the following example.

Calculate Permission Clusters

TABLE 1

All enumerated permission clusters

| Cluster ID | Operation | Enumerated Permission Cluster |
|---|---|---|
| C1 | enumerate universe | {P1, P2} |
| C2 | enumerate universe | {P1, P2, P3} |
| C3 | enumerate universe | {P1, P2, P3, P4} |
| C4 | enumerate universe | {P1, P2, P3, P4, P5} |
| C5 | enumerate universe less P2 | {P1, P3} |
| C6 | enumerate universe less P2 | {P1, P3, P4} |
| C7 | enumerate universe less P2 | {P1, P3, P4, P5} |
| C8 | enumerate universe less P3 | {P1, P2, P4} |
| C9 | enumerate universe less P3 | {P1, P2, P4, P5} |
| C10 | enumerate universe less P2 and P3 | {P1, P4} |
| C11 | enumerate universe less P2 and P3 | {P1, P4, P5} |
| C12 | enumerate universe less P2 and P3 and P4 | {P1, P5} |
| C13 | enumerate universe less P1 | {P2, P3} |

TABLE 1-continued

All enumerated permission clusters

| Cluster ID | Operation | Enumerated Permission Cluster |
|---|---|---|
| C14 | enumerate universe less P1 | {P2, P3, P4} |
| C15 | enumerate universe less P1 | {P2, P3, P4, P5} |
| C16 | enumerate universe less P2 and P4 | {P2, P4} |
| C17 | enumerate universe less P2 and P4 | {P2, P4, P5} |
| C18 | enumerate universe less P1 and P2 | {P3, P5} |
| C19 | enumerate universe less P1 and P2 | {P3, P4} |
| C20 | enumerate universe less P1 and P2 | {P3, P4, P5} |
| C21 | enumerate universe less P1 and P2 and P3 | {P4, P5} |
| C22 | enumerate universe less P4 | {P1,P2,P3} |
| C23 | enumerate universe less P4 | {P1, P2, P3, P5} |
| C24 | enumerate universe less P4 and P5 | {P1,P2,P3} |
| C25 | enumerate universe less P5 | {P1,P2,P3,P4} |

Given a universe of permissions {P1, P2, P3, P4, P5} the enumeration of unique clusters (e.g., combinations) yields the 22 unique clusters comprising at least two permissions.

Calculate Job-Permission Clusters

Given the enumerated clusters as shown in Table 1, each permission cluster can be evaluated to determine the number of jobs for which each and every permission in the candidate cluster is granted. Table 2 shows the permission clusters of Table 1 (see column Cluster ID) plus additional calculated columns. Column NPs gives the number of permissions in the corresponding candidate cluster. Column Jobs enumerates the jobs for which each and every permission in the candidate cluster is granted. The column Njobs calculates the number of jobs for which each and every permission in the candidate cluster is granted, and the column The column Product is the arithmetic product of (NPs*Njobs). See Table 2, below.

TABLE 2

| Cluster ID | Operation | Permission Cluster | NPs | Jobs | Njobs | Product |
|---|---|---|---|---|---|---|
| C1 | enumerate universe | {P1, P2} | 2 | J1 | 1 | 2 |
| C2 | enumerate universe | {P1, P2, P3} | 3 | J1 | 1 | 3 |
| C3 | enumerate universe | {P1, P2, P3, P4} | 4 | J1 | 1 | 4 |
| C4 | enumerate universe | {P1, P2, P3, P4, P5} | 5 | J1 | 1 | 5 |
| C5 | enumerate universe less P2 | {P1, P3} | 2 | J1 | 1 | 2 |
| C6 | enumerate universe less P2 | {P1, P3, P4} | 3 | J1 | 1 | 3 |
| C7 | enumerate universe less P2 | {P1, P3, P4, P5} | 4 | J1 | 1 | 4 |
| C8 | enumerate universe less P3 | {P1, P2, P4} | 3 | J1 | 1 | 3 |
| C9 | enumerate universe less P3 | {P1, P2, P4, P5} | 4 | J1 | 1 | 4 |
| C10 | enumerate universe less P2 and P3 | {P1, P4} | 2 | J1 | 1 | 2 |
| C11 | enumerate universe less P2 and P3 | {P1, P4, P5} | 3 | J1 | 1 | 3 |
| C12 | enumerate universe less P2 and P3 and P4 | {P1, P5} | 2 | J1 | 1 | 2 |
| C13 | enumerate universe less P1 | {P2, P3} | 2 | J1 | 1 | 2 |
| C14 | enumerate universe less P1 | {P2, P3, P4} | 3 | J1 | 1 | 3 |
| C15 | enumerate universe less P1 | {P2, P3, P4, P5} | 4 | J1 | 1 | 4 |
| C16 | enumerate universe less P2 and P4 | {P2, P4} | 2 | J1 | 1 | 2 |
| C17 | enumerate universe less P2 and P4 | {P2, P4, P5} | 3 | J1 | 1 | 3 |
| C18 | enumerate universe less P1 and P2 | {P3, P5} | 2 | J1, J2 | 2 | 4 |
| C19 | enumerate universe less P1 and P2 | {P3, P4} | 2 | J1 | 1 | 2 |
| C20 | enumerate universe less P1 and P2 | {P3, P4, P5} | 3 | J1 | 1 | 3 |
| C21 | enumerate universe less P1 and P2 and P3 | {P4, P5} | 2 | J1, J5, J3 | 3 | 6 |
| C22 | enumerate universe less P4 | {P1, P2, P3} | 0 | — | 0 | 0 |
| C23 | enumerate universe less P4 | {P1, P2, P3, P5} | 4 | J1 | 1 | 4 |
| C24 | enumerate universe less P4 and P5 | {P1, P2, P3} | 0 | — | 0 | 0 |
| C25 | enumerate universe less P5 | {P1, P2, P3, P4} | 0 | — | 0 | 0 |

In some embodiments, additional calculations are performed for each permission cluster. Specifically, some embodiments only consider those permissions that are not already marked as authorized via a candidate permission cluster. Some embodiments record calculations in a database table; thus, for each job, the job and the permission cluster that is written into a Job-Permission table and the number of job roles in the Job-Permission cluster table is incremented for each qualifying Job discovered. A permission cluster (e.g., cluster of authorizations or privileges) will be prioritized for consideration as a role based on the number of jobs that inherit all of its privileges in combination with the number of privileges it contains. Once the privileges have been authorized to a job by a candidate cluster, the privileges for those jobs should no longer be considered in the unauthorized privileges. The universe of unauthorized privileges is therefore reduced.

The presentation of Table 2 is merely illustrative of a momentary state of a data structure to hold data items of Table 2. In exemplary embodiments, operations performed on the aforementioned data structure are iterative, and possibly different momentary states of a data structure can occur at each iteration. For example, when calculating Job-Privilege clusters, once a Job-Privilege cluster has been calculated, then the constituent privileges in that Job-Privilege cluster can be removed from the remaining Job-Privilege clusters such that any further Job-Privilege clusters are formed using only permissions that are not already included in any previously-formed Job-Privilege cluster.

Select Candidate Privilege Clusters

Various operations can be performed so as to select (or exclude) permission clusters for further consideration. For example, a data structure such as Table 3 can be sorted so the Job-Permission Cluster with the highest product is first listed. Table 3 gives such a sorted table.

TABLE 3

| Cluster ID | Operation | Permission Cluster | NPs | Jobs | Njobs | Product |
|---|---|---|---|---|---|---|
| C21 | enumerate universe less P1 and P2 and P3 | {P4, P5} | 2 | J1, J5, J3 | 3 | 6 |

TABLE 3-continued

| Cluster ID | Operation | Permission Cluster | NPs | Jobs | Njobs | Product |
|---|---|---|---|---|---|---|
| C18 | enumerate universe less P1 and P2 | {P3, P5} | 2 | J1, J2 | 2 | 4 |
| C4 | enumerate universe | {P1, P2, P3, P4, P5} | 5 | J1 | 1 | 5 |
| C3 | enumerate universe | {P1, P2, P3, P4} | 4 | J1 | 1 | 4 |
| C7 | enumerate universe less P2 | {P1, P3, P4, P5} | 4 | J1 | 1 | 4 |
| C9 | enumerate universe less P3 | {P1, P2, P4, P5} | 4 | J1 | 1 | 4 |
| C15 | enumerate universe less P1 | {P2, P3, P4, P5} | 4 | J1 | 1 | 4 |
| C23 | enumerate universe less P4 | {P1, P2, P3, P5} | 4 | J1 | 1 | 4 |
| C2 | enumerate universe | {P1, P2, P3} | 3 | J1 | 1 | 3 |
| C6 | enumerate universe less P2 | {P1, P3, P4} | 3 | J1 | 1 | 3 |
| C8 | enumerate universe less P3 | {P1, P2, P4} | 3 | J1 | 1 | 3 |
| C11 | enumerate universe less P2 and P3 | {P1, P4, P5} | 3 | J1 | 1 | 3 |
| C14 | enumerate universe less P1 | {P2, P3, P4} | 3 | J1 | 1 | 3 |
| C17 | enumerate universe less P2 and P4 | {P2, P4, P5} | 3 | J1 | 1 | 3 |
| C20 | enumerate universe less P1 and P2 | {P3, P4, P5} | 3 | J1 | 1 | 3 |
| C1 | enumerate universe | {P1, P2} | 2 | J1 | 1 | 2 |
| C5 | enumerate universe less P2 | {P1, P3} | 2 | J1 | 1 | 2 |
| C10 | enumerate universe less P2 and P3 | {P1, P4} | 2 | J1 | 1 | 2 |
| C12 | enumerate universe less P2 and P3 and P4 | {P1, P5} | 2 | J1 | 1 | 2 |
| C13 | enumerate universe less P1 | {P2, P3} | 2 | J1 | 1 | 2 |
| C16 | enumerat euniverse less P2 and P4 | {P2, P4} | 2 | J1 | 1 | 2 |
| C19 | enumerate universe less P1 and P2 | {P3, P4} | 2 | J1 | 1 | 2 |
| C22 | enumerate universe less P4 | {P1,P2,P3} | 0 | — | 0 | 0 |
| C24 | enumerate universe less P4 and P5 | {P1,P2,P3} | 0 | — | 0 | 0 |
| C25 | enumerate universe less P5 | {P1,P2,P3,P4} | 0 | — | 0 | 0 |

In some situations, relationships between roles are defined as having segregation of duty constraints (e.g., "segregation of duty", SOD constraints), which can result in a permission cluster that violates other rules. In some embodiments, an operator (e.g., a user) might determine to eliminate any roles having segregation of duty constraints, and such elimination can be conveniently performed in this step (or in other steps, as in some embodiments).

Recalculate Calculate Job-Permission Clusters

It is possible than fewer than all of the enumerated permissions become authorized into a Job-Permission Cluster. In such a case, a new universe of permissions is formed of only the permissions that were not authorized in the former calculations, and the calculation of Job-Permission Clusters is repeated. This recalculation step can be performed iteratively until all clusters of permissions have been authorized.

Match Candidate Privilege Clusters Against Existing Duties: Name Virtual Roles

As earlier indicated, a virtual role can be discovered through cluster analysis (e.g., as discussed above) and a virtual role may or may not correspond to any existing named role. Yet, to support the act of assigning one or more virtual roles, a name may be assigned. The name might be assigned on the basis of a quantitative match to named roles.

In one embodiment, such a naming can be facilitated as follows: When all Job Privileges have Authorizing Privilege Clusters, match the candidate clusters against existing named roles. Strictly as an example, for each privilege cluster, record the M named roles with the highest degree of match with the privileges in the privilege cluster and use the essence of the top M named roles to define a convenient name for the virtual role. A highest degree of match can be measured as the number of privileges in the intersection divided by the number of privileges in the union. For example, if the number of privileges in the privilege cluster "Cluster 1" has 10 privileges, and the existing role "Payables Invoice Management" has 9 privileges, and the intersection is 8 privileges, the degree of match is 8/11 or 81% i.e., Union=Intersection (8)+Complement from cluster 1 (2)+ Complement from Payables invoice Management (1). Table 4 shows such a match calculation, Table 5 shows only the non-null clusters.

TABLE 4

Match of candidate permission clusters to existing duties

| Duty | Clusters | Union | Intersection | Match |
|---|---|---|---|---|
| D1.1 | {C14} | 2 | 2 | 1 |
| D1.2 | {C21, C8} | 5 | 1 | 5 |
| D1.3 | — | | | — |
| D2.1 | {C18} | 2 | 2 | 1 |
| D2.2 | — | | | — |
| D2.3 | — | | | — |
| D5.1 | {C21} | 2 | 2 | 1 |
| D5.2 | — | | | — |
| D5.3 | — | | | — |

TABLE 5

Match of candidate permission clusters to existing cuties (removing non-matching or redundant clusters)

| Duty | Clusters | Union | Intersection | Match |
|---|---|---|---|---|
| D1.2 | {C21, C8} | 5 | 1 | 5 |
| D1.1 | {C14} | 2 | 2 | 1 |
| D2.1 | {C18} | 2 | 2 | 1 |
| D5.1 | {C21} | 2 | 2 | 1 |

Strictly as an option, some embodiments, apply a quantitative objective function (e.g., a quantitative minimization function, a quantitative maximization function, etc.) in order to quantify the goodness of the enumerated candidate permission clusters. For example one possible quantitative objective function is given as:

$$\min f(x) = \{R*G*M\} \quad (EQ. 1)$$

where
R=Number of Roles
G=Number of Grants, and
M=Number of Role Memberships

Now, returning to the discussion of system 1A00, a new employee taking on a particular job can be authorized by selecting only the few permission clusters that are needed to fully authorize the new employee with all needed permissions. As jobs and duties and permissions evolve (e.g., are added, or a become obsolete, or otherwise eliminated), the clusters can be recalculated.

Additional Embodiments of the Disclosure

Figure 4:
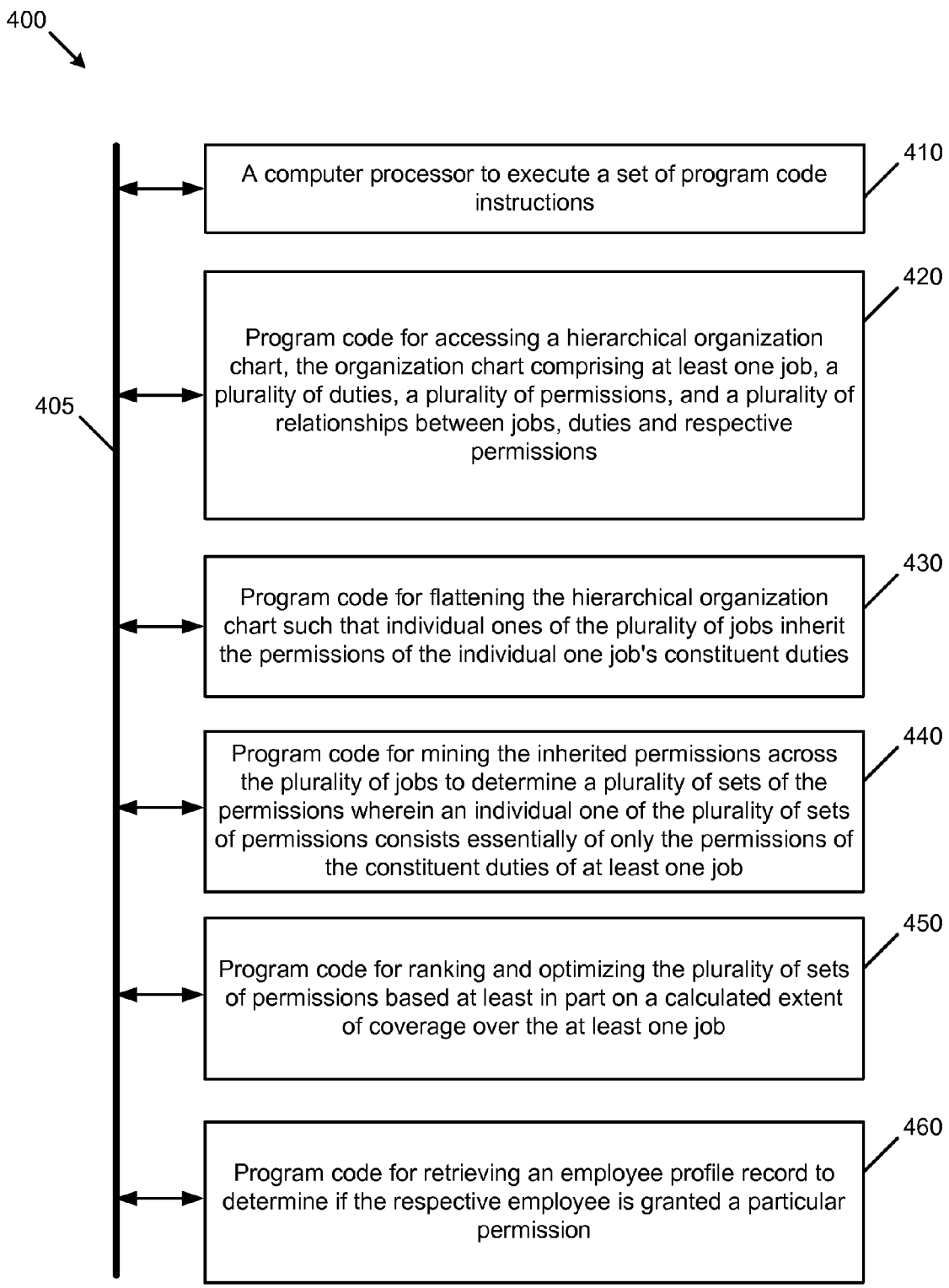
FIG. 4 is a block diagram of a system for roles discovery using privilege cluster analysis, according to some embodiments.

FIG. 4 is a block diagram of a system for roles discovery using privilege cluster analysis. As an option, the present system 400 may be implemented in the context of the architecture and functionality of the embodiments described herein. Of course, however, the system 400 or any operation therein may be carried out in any desired environment.

As shown, system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims. The embodiment of FIG. 4 implements a portion of a computer system, shown as system 400, comprising a computer processor to execute a set of program code instructions (see module 410) and modules for accessing memory to hold program code instructions to perform: accessing a hierarchical organization chart, the organization chart comprising at least one job, a plurality of duties, a plurality of permissions, and a plurality of relationships between jobs, duties and respective permissions (see module 420); flattening the hierarchical organization chart such that individual ones of the plurality of jobs inherit the permissions of the individual one job's constituent duties (see module 430); mining the inherited permissions across the plurality of jobs to determine a plurality of sets of the permissions wherein an individual one of the plurality of sets of permissions consists essentially of only the permissions of the constituent duties of at least one job (see module 440); optimizing (e.g., ranking and selecting) the plurality of sets of the permissions based at least in part on a calculated extent of coverage over the at least one job (see module 450); and retrieving an employee profile record to determine if the respective employee is granted a particular permission (see operation 460).

Figure 5:
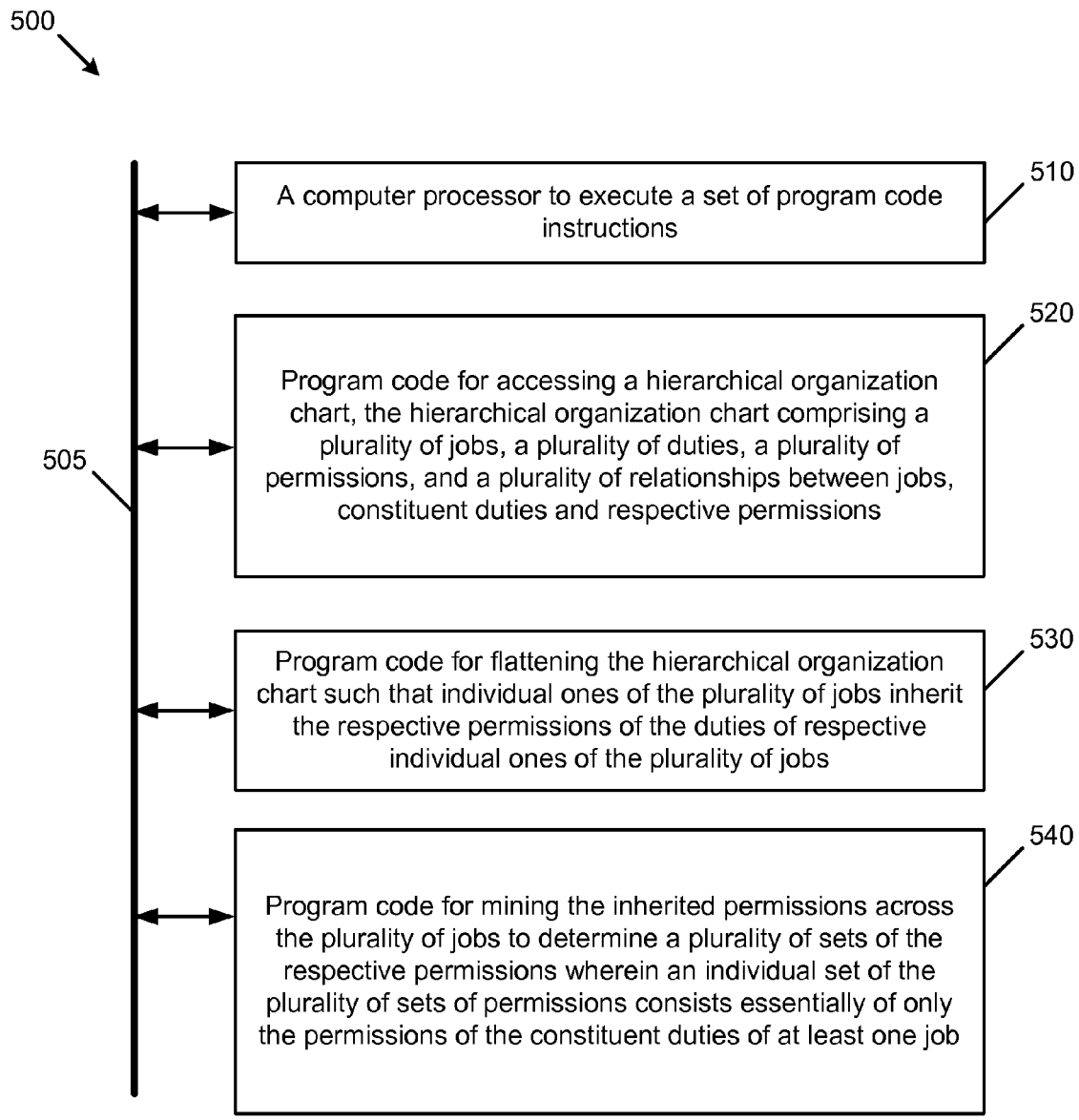
FIG. 5 is a block diagram of a system for roles discovery using privilege cluster analysis, according to certain embodiments.

FIG. 5 is a block diagram of a system for roles discovery using privilege cluster analysis. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: accessing a hierarchical organization chart, the hierarchical organization chart comprising a plurality of jobs, a plurality of duties, a plurality of permissions, and a plurality of relationships between jobs, constituent duties and respective permissions (see module 520); flattening the hierarchical organization chart such that individual ones of the plurality of jobs inherit the respective permissions of the duties of respective individual ones of the plurality of jobs (see module 530); and mining the inherited permissions across the plurality of jobs to determine a plurality of sets of the respective permissions wherein an individual set of the plurality of sets of permissions consists essentially of only the permissions of the constituent duties of at least one job (see module 540).

System Architecture Overview

Figure 6:
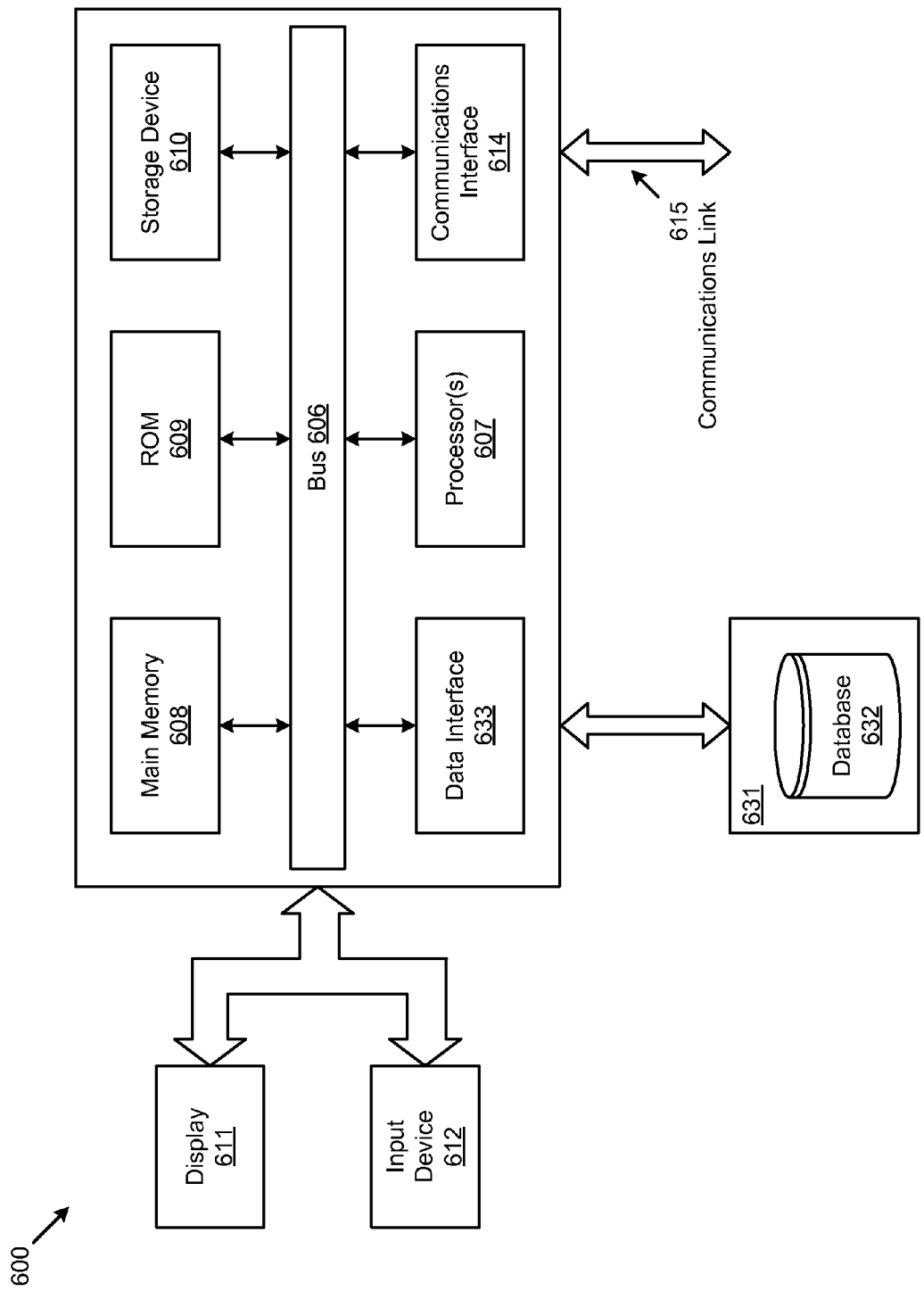
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for roles discovery using permission cluster analysis, the method comprising:
   accessing a hierarchy of data that corresponds to an organization chart and that comprises one or more levels of the hierarchy with root nodes corresponding to one or more employee position titles, mid-level nodes corresponding to constituent duties of the one or more employee position titles and leaf nodes corresponding to respective permissions of the constituent duties controlling computer network access;
   traversing the one or more levels of the hierarchy;
   retrieving, based on the traversing, a set of permissions;
   enumerating one or more permissions inherited by each employee position title based on the hierarchy of data;
   clustering the set of permissions into a plurality of sets of clustered permissions comprising all combinations of individual permissions, by:
     implementing a first database table for generating unique clusters of permissions, the first database table comprising:
       (i) a first column that identifies an operation to calculate permission clusters comprising of at least two permissions for a given cluster,
       (ii) a second column that holds results from performing the operation from the first column to calculate the permission clusters,
       (iii) a plurality of database table rows, each row of the plurality of the database rows corresponding to a specific permission cluster in the second column formed from an application of a respective operation in the first column to calculate the specific permission cluster, such that the unique permission clusters are identified based at least upon a resolution of duplicated permission clusters in the second column,
     implementing a second database table for correlating the permission clusters with jobs, the second database table comprising a plurality of rows that each correlates one of the unique permission clusters from the first table to a set of one or more jobs, the plurality of rows in the second database table being sortable by a correlation factor between a specific permission cluster and the one or more jobs;
   assigning one or more of the plurality of sets of clustered permissions to a respective virtual role;
   storing an assigned one or more sets of clustered permissions in association with the respective virtual role in one or more database tables;
   retrieving data from a respective database table;
   determining, based on the retrieving of the data, whether a specific permission is stored in the respective database table in association with one or more virtual roles; and
   controlling access to the computer network by performing at least one of (i) granting or (ii) denying access to a resource within the computer network to an employee associated with the one or more virtual roles.

2. The method of claim 1, wherein a particular individual set of the plurality of sets of clustered permissions corresponds to the permissions of the constituent duties of at least two employee position titles.

3. The method of claim 1, further comprising naming at least one of the plurality of sets of clustered permissions.

4. The method of claim 1, further comprising ranking at least some of the plurality of sets of clustered permissions using an objective optimization function.

5. The method of claim 4, wherein the objective optimization function comprises a minimization function or a maximization function.

6. The method of claim 1, further comprising:
   naming at least one of the plurality of sets of clustered permissions, in which a particular individual set of the plurality of sets of clustered permissions corresponds to the permissions of the constituent duties of at least two employee position titles and each of the set of clustered permissions having been used within a threshold amount of time from a current time;
   maintaining one or more of a database describing one or more employees corresponding to the one or more employee position titles, a database describing one or more employee position titles, a database describing one or more duties of one or more employee position titles, and a database describing one or more permissions of one or more duties;
   modifying one or more of the database describing one or more employees corresponding to the one or more employee position titles, the database describing one or more employee position titles, the database describing one or more duties of one or more employee position titles, and the database describing one or more permissions of one or more duties, the modifying comprising creating, deleting, or altering information maintained in a database based on information received via a graphical user interface;
   naming at least one of the plurality of sets of clustered permissions based at least in part on a measure of similarity between one or more permissions of the at least one of the plurality of sets of clustered permissions and or more permissions corresponding to one or more existing named duties;
   presenting to a user, using a graphical user interface, a mapping of at least one of the plurality of sets of clustered permissions to an employee position title for assigning permissions, the graphical user interface comprising one or more options to select one or more employee position titles, one or more duties, and one or more permissions;
   clustering, using a clustering engine, the set of permissions into a plurality of sets of clustered permissions corresponding to different combinations of permissions formed from individual permissions that correspond to the permissions of the constituent duties of at least one employee position title, the plurality of sets of clustered permissions comprising mutually exclusive combinations of the permissions;

identifying one or more of the plurality of sets of clustered permissions that do not correspond to a duty of the one or more employee position titles;

removing the identified one or more of the plurality of sets of clustered permissions that do not correspond to a duty of the one or more employee position titles from the one or more of the plurality of sets of clustered permissions;

generating the organization chart based one or more of the database describing one or more employee position titles, the database describing one or more duties of one or more employee position titles, and the database describing one or more permissions of one or more duties, the organization chart comprising a computer-readable hierarchical organization chart;

generating a record of duties of one or more employee position titles, the generating comprising:
    analyzing one or more duties of one or more employee position titles,
    generating the record of duties based at least in part on the analysis, and
    storing the record of duties in association with the one or more employee position titles;

ranking at least some of the plurality of sets of clustered permissions based at least in part on one or more calculations performed on each of the sets of clustered permissions, the one or more calculations performed on one or more of a number of permissions included in a set of clustered permissions, a number of employee position titles corresponding to permissions included in a set of clustered permissions, and a number of employee position titles for which every permission included in a set of clustered permissions is assigned to an employee position title;

ranking at least some of the plurality of sets of clustered permissions using an objective optimization function, in which the objective optimization function comprises a minimization function or a maximization function that minimizes or maximizes at least one of a number of virtual roles to which one or more of the plurality of sets of clustered permissions are assigned, a number of clusters of permissions included in a set of clustered permissions, a number of permissions included in one or more of a set of clustered permissions, a number of employee position titles corresponding to a set of clustered permissions, one or more permissions required to be assigned to an employee position title, and a measure of similarity between permissions included in one or more of a set of clustered permissions and permissions previously assigned to one or more employee position titles;

ranking at least some of the plurality of sets of clustered permissions based at least in part on a calculated extent of coverage of each set of clustered permissions over a plurality of employee position titles;

assigning one or more of the plurality of sets of clustered permissions to one or more employee position titles based at least in part on a ranking;

assigning one or more of a set of clustered permissions and a virtual role to an employee position title;

assigning one or more virtual roles to an employee position title, a set of the one or more virtual roles corresponding to a set of existing named roles;

authorizing an assignment of a cluster of permissions to an employee or an employee position title;

clustering, using a clustering engine, a set of permissions into one or more sets of clustered permissions corresponding to different combinations of permissions, each permission of the set of permissions assigned to a virtual role that has not been authorized for assignment to an employee or to an employee position title;

identifying one or more permissions assigned to a virtual role that are not required to perform one or more duties of an employee position to which the virtual role is assigned;

storing a mapping of at least one of the plurality of sets of permissions to an employee position title in a profile record; and retrieving the profile record to determine if an employee corresponding to the profile record is granted a particular permission.

7. The method of claim 1, further comprising ranking at least some of the plurality of sets of permissions based at least in part on a calculated extent of coverage over a plurality of employee position titles.

8. The method of claim 1, further comprising storing a mapping of at least one of the plurality of sets of permissions to the employee position title in a profile record.

9. The method of claim 8, further comprising retrieving the profile record to determine if an employee corresponding to the profile record is granted a particular permission.

10. The method of claim 1, wherein the plurality of sets of clustered permissions correspond to different combinations formed from the individual permissions.

11. A computer system for roles discovery using permission cluster analysis, comprising:
    a computer processor to execute a set of program code instructions; and
    a memory to hold the program code instructions, in which the program code instructions comprises a discovery engine to perform:
    accessing a hierarchy of data that corresponds to an organization chart and that comprises one or more levels of the hierarchy with root nodes corresponding to one or more employee position titles, mid-level nodes corresponding to constituent duties of the one or more employee position titles and leaf nodes corresponding to respective permissions of the constituent duties controlling computer network access;
    traversing the one or more levels of the hierarchy;
    retrieving, based on the traversing, a set of permissions;
    enumerating one or more permissions inherited by each employee position title based on the hierarchy of data;
    clustering the set of permissions into a plurality of sets of clustered permissions comprising all combinations of individual permissions, by
        implementing a first database table for generating unique clusters of permissions, the first database table comprising:
            (i) a first column that identifies an operation to calculate permission clusters comprising of at least two permissions for a given cluster,
            (ii) a second column that holds results from performing the operation from the first column to calculate the permission clusters,
            (iii) a plurality of database table rows, each row of the plurality of the database rows corresponding to a specific permission cluster in the second column formed from an application of a respective operation in the first column to calculate the specific permission cluster, such that the unique permission clusters are identified based at least upon a resolution of duplicated permission clusters in the second column, implementing a second database table for correlating the permission clusters with jobs, the second database table comprising a plurality of rows that each correlates one of the unique permission clusters from the first table to a set of one or more jobs, the plurality of rows in the second database table being sortable by a correlation factor between a specific permission cluster and the one or more jobs;

assigning one or more of the plurality of sets of clustered permissions to a respective virtual role;

storing an assigned one or more sets of clustered permissions in association with the respective virtual role in one or more database tables;

retrieving data from a respective database table;

determining, based on the retrieving of the data, whether a specific permission is stored in the respective database table in association with one or more virtual roles; and controlling access to the computer network by performing at least one of (i) granting or (ii) denying access to a resource within the computer network to an employee associated with the one or more virtual roles.

12. The computer system of claim 11, wherein a particular individual set of the plurality of sets of clustered permissions corresponds to the permissions of the constituent duties of at least two employee position titles.

13. The computer system of claim 11, wherein the program code instructions further comprise instructions to perform naming at least one of the plurality of sets of clustered permissions, in which a particular individual set of the plurality of sets of clustered permissions corresponds to the permissions of the constituent duties of at least two employee position titles and each of the set of clustered permissions having been used within a threshold amount of time from a current time;

maintaining one or more of a database describing one or more employees corresponding to the one or more employee position titles, a database describing one or more employee position titles, a database describing one or more duties of one or more employee position titles, and a database describing one or more permissions of one or more duties;

modifying one or more of the database describing one or more employees corresponding to the one or more employee position titles, the database describing one or more employee position titles, the database describing one or more duties of one or more employee position titles, and the database describing one or more permissions of one or more duties, the modifying comprising creating, deleting, or altering information maintained in a database based on information received via a graphical user interface;

naming at least one of the plurality of sets of clustered permissions based at least in part on a measure of similarity between one or more permissions of the at least one of the plurality of sets of clustered permissions and or more permissions corresponding to one or more existing named duties;

presenting to a user, using a graphical user interface, a mapping of at least one of the plurality of sets of clustered permissions to an employee position title for assigning permissions, the graphical user interface comprising one or more options to select one or more employee position titles, one or more duties, and one or more permissions;

clustering, using a clustering engine, the set of permissions into a plurality of sets of clustered permissions corresponding to different combinations of permissions formed from individual permissions that correspond to the permissions of the constituent duties of at least one employee position title, the plurality of sets of clustered permissions comprising mutually exclusive combinations of the permissions;

identifying one or more of the plurality of sets of clustered permissions that do not correspond to a duty of the one or more employee position titles;

removing the identified one or more of the plurality of sets of clustered permissions that do not correspond to a duty of the one or more employee position titles from the one or more of the plurality of sets of clustered permissions;

generating the organization chart based one or more of the database describing one or more employee position titles, the database describing one or more duties of one or more employee position titles, and the database describing one or more permissions of one or more duties, the organization chart comprising a computer-readable hierarchical organization chart;

generating a record of duties of one or more employee position titles, the generating comprising:
analyzing one or more duties of one or more employee position titles,
generating the record of duties based at least in part on the analysis, and
storing the record of duties in association with the one or more employee position titles;

ranking at least some of the plurality of sets of clustered permissions based at least in part on one or more calculations performed on each of the sets of clustered permissions, the one or more calculations performed on one or more of a number of permissions included in a set of clustered permissions, a number of employee position titles corresponding to permissions included in a set of clustered permissions, and a number of employee position titles for which every permission included in a set of clustered permissions is assigned to an employee position title;

ranking at least some of the plurality of sets of clustered permissions using an objective optimization function, in which the objective optimization function comprises a minimization function or a maximization function that minimizes or maximizes at least one of a number of virtual roles to which one or more of the plurality of sets of clustered permissions are assigned, a number of clusters of permissions included in a set of clustered permissions, a number of permissions included in one or more of a set of clustered permissions, a number of employee position titles corresponding to a set of clustered permissions, one or more permissions required to be assigned to an employee position title, and a measure of similarity between permissions included in one or more of a set of clustered permissions and permissions previously assigned to one or more employee position titles;

ranking at least some of the plurality of sets of clustered permissions based at least in part on a calculated extent of coverage of each set of clustered permissions over a plurality of employee position titles;

assigning one or more of the plurality of sets of clustered permissions to one or more employee position titles based at least in part on a ranking;

assigning one or more of a set of clustered permissions and a virtual role to an employee position title;

assigning one or more virtual roles to an employee position title, a set of the one or more virtual roles corresponding to a set of existing named roles;

authorizing an assignment of a cluster of permissions to an employee or an employee position title;

clustering, using a clustering engine, a set of permissions into one or more sets of clustered permissions corresponding to different combinations of permissions, each permission of the set of permissions assigned to a virtual role that has not been authorized for assignment to an employee or to an employee position title;

identifying one or more permissions assigned to a virtual role that are not required to perform one or more duties of an employee position to which the virtual role is assigned;

storing a mapping of at least one of the plurality of sets of permissions to an employee position title in a profile record; and retrieving the profile record to determine if an employee corresponding to the profile record is granted a particular permission.

14. The computer system of claim 11, further comprising ranking at least some of the plurality of sets of clustered permissions using an objective optimization function.

15. The computer system of claim 11, further comprising ranking at least some of the plurality of sets of clustered permissions based at least in part on a calculated extent of coverage over a plurality of employee position titles.

16. The computer system of claim 11, further comprising storing a mapping of at least one of the plurality of sets of clustered permissions to the employee position title in a profile record.

17. The computer system of claim 11, wherein the plurality of sets of clustered permissions correspond to different combinations formed from the individual permissions.

18. A computer program product embodied in a non-transitory computer readable medium, the computer readable medium having stored thereon a sequence of instructions which, when executed by a processor causes the processor to execute a process to implement roles discovery using permission cluster analysis by a discovery engine, the process comprising:

accessing a hierarchy of data that corresponds to an organization chart and that comprises one or more levels of the hierarchy with root nodes corresponding to one or more employee position titles, mid-level nodes corresponding to constituent duties of the one or more employee position titles and leaf nodes corresponding to respective permissions of the constituent duties controlling computer network access;

traversing the one or more levels of the hierarchy;

retrieving, based on the traversing, a set of permissions;

enumerating one or more permissions inherited by each employee position title based on the hierarchy of data;

clustering the set of permissions into a plurality of sets of clustered permissions comprising all combinations of individual permissions, by:

implementing a first database table for generating unique clusters of permissions, the first database table comprising:

(i) a first column that identifies an operation to calculate permission clusters comprising of at least two permissions for a given cluster, (ii) a second column that holds results from performing the operation from the first column to calculate the permission clusters, (iii) a plurality of database table rows, each row of the plurality of the database rows corresponding to a specific permission cluster in the second column formed from an application of a respective operation in the first column to calculate the specific permission cluster, such that the unique permission clusters are identified based at least upon a resolution of duplicated permission clusters in the second column, implementing a second database table for correlating the permission clusters with jobs, the second database table comprising a plurality of rows that each correlates one of the unique permission clusters from the first table to a set of one or more jobs, the plurality of rows in the second database table being sortable by a correlation factor between a specific permission cluster and the one or more jobs;

assigning one or more of the plurality of sets of clustered permissions to a respective virtual role;

storing an assigned one or more sets of clustered permissions in association with the respective virtual role in one or more database tables;

retrieving data from a respective database table;

determining, based on the retrieving of the data, whether a specific permission is stored in the respective database table in association with one or more virtual roles; and controlling access to the computer network by performing at least one of (i) granting or (ii) denying access to a resource within the computer network to an employee associated with the one or more virtual roles.

19. The computer program product of claim 18, wherein the plurality of sets of clustered permissions correspond to different combinations formed from the individual permissions.

20. The computer program product of claim 18, the process further comprising:

naming at least one of the plurality of sets of clustered permissions, in which a particular individual set of the plurality of sets of clustered permissions corresponds to the permissions of the constituent duties of at least two employee position titles and each of the set of clustered permissions having been used within a threshold amount of time from a current time;

maintaining one or more of a database describing one or more employees corresponding to the one or more employee position titles, a database describing one or more employee position titles, a database describing one or more duties of one or more employee position titles, and a database describing one or more permissions of one or more duties;

modifying one or more of the database describing one or more employees corresponding to the one or more employee position titles, the database describing one or more employee position titles, the database describing one or more duties of one or more employee position titles, and the database describing one or more permissions of one or more duties, the modifying comprising creating, deleting, or altering information maintained in a database based on information received via a graphical user interface;

naming at least one of the plurality of sets of clustered permissions based at least in part on a measure of similarity between one or more permissions of the at least one of the plurality of sets of clustered permissions and or more permissions corresponding to one or more existing named duties;

presenting to a user, using a graphical user interface, a mapping of at least one of the plurality of sets of clustered permissions to an employee position title for assigning permissions, the graphical user interface comprising one or more options to select one or more employee position titles, one or more duties, and one or more permissions;

clustering, using a clustering engine, the set of permissions into a plurality of sets of clustered permissions corresponding to different combinations of permissions formed from individual permissions that correspond to the permissions of the constituent duties of at least one employee position title, the plurality of sets of clustered permissions comprising mutually exclusive combinations of the permissions;

identifying one or more of the plurality of sets of clustered permissions that do not correspond to a duty of the one or more employee position titles;

removing the identified one or more of the plurality of sets of clustered permissions that do not correspond to a duty of the one or more employee position titles from the one or more of the plurality of sets of clustered permissions;

generating the organization chart based one or more of the database describing one or more employee position titles, the database describing one or more duties of one or more employee position titles, and the database describing one or more permissions of one or more duties, the organization chart comprising a computer-readable hierarchical organization chart;

generating a record of duties of one or more employee position titles, the generating comprising:
 analyzing one or more duties of one or more employee position titles,
 generating the record of duties based at least in part on the analysis, and
 storing the record of duties in association with the one or more employee position titles;

ranking at least some of the plurality of sets of clustered permissions based at least in part on one or more calculations performed on each of the sets of clustered permissions, the one or more calculations performed on one or more of a number of permissions included in a set of clustered permissions, a number of employee position titles corresponding to permissions included in a set of clustered permissions, and a number of employee position titles for which every permission included in a set of clustered permissions is assigned to an employee position title;

ranking at least some of the plurality of sets of clustered permissions using an objective optimization function, in which the objective optimization function comprises a minimization function or a maximization function that minimizes or maximizes at least one of a number of virtual roles to which one or more of the plurality of sets of clustered permissions are assigned, a number of clusters of permissions included in a set of clustered permissions, a number of permissions included in one or more of a set of clustered permissions, a number of employee position titles corresponding to a set of clustered permissions, one or more permissions required to be assigned to an employee position title, and a measure of similarity between permissions included in one or more of a set of clustered permissions and permissions previously assigned to one or more employee position titles;

ranking at least some of the plurality of sets of clustered permissions based at least in part on a calculated extent of coverage of each set of clustered permissions over a plurality of employee position titles;

assigning one or more of the plurality of sets of clustered permissions to one or more employee position titles based at least in part on a ranking;

assigning one or more of a set of clustered permissions and a virtual role to an employee position title;

assigning one or more virtual roles to an employee position title, a set of the one or more virtual roles corresponding to a set of existing named roles;

authorizing an assignment of a cluster of permissions to an employee or an employee position title;

clustering, using a clustering engine, a set of permissions into one or more sets of clustered permissions corresponding to different combinations of permissions, each permission of the set of permissions assigned to a virtual role that has not been authorized for assignment to an employee or to an employee position title;

identifying one or more permissions assigned to a virtual role that are not required to perform one or more duties of an employee position to which the virtual role is assigned;

storing a mapping of at least one of the plurality of sets of permissions to an employee position title in a profile record; and retrieving the profile record to determine if an employee corresponding to the profile record is granted a particular permission.

* * * * *